(12) United States Patent
Guerra

(10) Patent No.: US 7,614,153 B2
(45) Date of Patent: Nov. 10, 2009

(54) ROTARY HEAD FOR GARDEN TRIMMERS, OF THE TYPE COMPRISING PIVOTED CUTTER MEANS

(76) Inventor: Lauro Guerra, Via Nuova Lemizzone, 7, 42015 Correggio (RE) (IT)

( * ) Notice: Subject to any disclaimer, the term of this patent is extended or adjusted under 35 U.S.C. 154(b) by 288 days.

(21) Appl. No.: 11/702,024

(22) Filed: Feb. 2, 2007

(65) Prior Publication Data

US 2007/0180706 A1    Aug. 9, 2007

(30) Foreign Application Priority Data

Feb. 3, 2006    (IT)    .......................... MI2006A0189

(51) Int. Cl.
*B26B 7/00*    (2006.01)
(52) U.S. Cl. .......................... 30/276; 30/300
(58) Field of Classification Search .................. 30/276, 30/300; 56/12.7, 17.1
See application file for complete search history.

(56) References Cited

U.S. PATENT DOCUMENTS

| | | | | |
|---|---|---|---|---|
| 5,617,636 A * | 4/1997 | Taggett et al. | .................. | 30/276 |
| 5,622,035 A * | 4/1997 | Kondo et al. | .................. | 56/12.7 |
| 5,722,172 A * | 3/1998 | Walden | ........................ | 30/347 |
| 5,791,054 A * | 8/1998 | Bessinger | .................... | 30/276 |
| 5,979,064 A * | 11/1999 | Kitz et al. | ..................... | 30/347 |
| 6,112,416 A * | 9/2000 | Bridges et al. | ................ | 30/276 |
| 6,119,350 A * | 9/2000 | Sutliff et al. | ................... | 30/276 |
| 6,263,580 B1 * | 7/2001 | Stark et al. | .................... | 30/276 |
| 6,279,235 B1 * | 8/2001 | White et al. | .................. | 30/276 |
| 6,349,475 B1 * | 2/2002 | Buck | ........................... | 30/276 |
| 6,427,341 B1 * | 8/2002 | Lee | ............................. | 30/347 |
| 6,735,874 B2 * | 5/2004 | Iacona | ......................... | 30/276 |
| 6,817,102 B2 * | 11/2004 | Harris et al. | .................. | 30/276 |
| 6,834,486 B2 * | 12/2004 | Thompson et al. | ............ | 56/255 |
| 6,912,789 B2 * | 7/2005 | Price, III | ..................... | 30/276 |
| 7,000,324 B2 * | 2/2006 | Fogle | .......................... | 30/276 |
| 2001/0027610 A1 * | 10/2001 | Wheeler et al. | ............... | 30/276 |
| 2002/0029483 A1 * | 3/2002 | Price | .......................... | 30/276 |
| 2003/0196332 A1 * | 10/2003 | Harris et al. | .................. | 30/276 |

(Continued)

FOREIGN PATENT DOCUMENTS

FR    2 382 840    10/1978

(Continued)

*Primary Examiner*—Kenneth E. Peterson
*Assistant Examiner*—Sean Michalski
(74) *Attorney, Agent, or Firm*—Ladas & Parry LLP

(57) ABSTRACT

The rotary head (10) for garden trimmers, of the type with its cutter means (28, 30) pivoted to the head (10), comprises a lower shell (12) and an upper annular shell (14). The lower shell (12) is fixable coaxially to the trimmer drive shaft (20). The head presents several fixed pins (18) parallel to the rotational axis (10) of the head (10), for pivoting the cutter means (28, 30) provided with an eyelet. The upper shell (14) is coaxially applicable in its working position to the lower shell (12), in which position the cutter means (28, 30) are retained on the relative fixed pins (18), which project upwards from the lower shell (12). To apply the upper shell (14) to the lower shell (12) in said working position bayonet connection means (22, 24) are provided requiring a coaxial movement to cause the two shells (12, 14) to approach each other and a rotation of the upper shell (14) about the lower shell (12), this rotation being opposite to the direction of rotation (R) of the head (10) when working.

27 Claims, 3 Drawing Sheets

U.S. PATENT DOCUMENTS

| | | | |
|---|---|---|---|
| 2004/0148785 A1* | 8/2004 | Price, III | 30/276 |
| 2005/0050738 A1* | 3/2005 | Harris et al. | 30/276 |
| 2005/0241157 A1* | 11/2005 | Fogle | 30/276 |
| 2007/0180705 A1* | 8/2007 | Chiu | 30/276 |
| 2007/0180706 A1* | 8/2007 | Guerra | 30/276 |
| 2008/0127496 A1* | 6/2008 | Proulx | 30/276 |
| 2008/0196255 A1* | 8/2008 | Strader | 30/276 |

FOREIGN PATENT DOCUMENTS

| | | |
|---|---|---|
| FR | 2 792 162 A3 | 10/2000 |
| IT | 990 187 A1 | 3/1999 |
| IT | MI2005 000288 | 8/2005 |
| WO | 03/013217 A1 | 2/2003 |

\* cited by examiner

ROTARY HEAD FOR GARDEN TRIMMERS, OF THE TYPE COMPRISING PIVOTED CUTTER MEANS

The present invention relates to garden trimmers and more particularly to those garden trimmers in which the rotary head is provided with several cutting elements pivoted at one of their ends to the same head in angularly equidistant positions, so that during trimmer operation each of these cutter means can rotate about its pivoting axis, which is parallel to the rotational axis of the head.

In a first known head of this type, in which the cutter means are in the form of a plastic blade or knife, and provided with an end eyelet for their pivoting to the head, this latter is roughly in the form of a disc composed of an upper shell and a lower shell joined together by a central screw which also fixes the head to the trimmer operating shaft. Said bladed cutter means are normally three in number, they being normally pivoted by respective screws and relative nuts. Each screw acts as a pivot pin on which the eyelet of the corresponding blade is mounted.

When a blade is to be changed, for example because it is worn or damaged, a tool (normally a screwdriver) has to be used to unscrew the screw-pin relative to that blade. In doing this, care must be taken not to lose the nut, the screw or the washer normally placed under the screw head. As the trimmer is used on grassy or bushy ground, if one of said pieces falls it is not easy to find again. When one of the screw-pins has been extracted, the relative blade can be replaced by a new blade, the same screw-pin being inserted through its pivoting eyelet and then through the relative hole provided in the head (without forgetting the washer), then finally screwing the screw-pin into its nut (normally contained in a recess provided in the head to prevent its rotation), after which the trimmer can return to operation.

Another known head provided with pivoted cutter means comprises an upper shell and a lower shell joined together by a central screw. To replace the blades the two shells have to be separated. For each blade, a relative downwardly projecting fixed pin is provided on the downwardly facing face of the upper shell to receive the pivoting eyelet of that blade. When the two shells are joined together by said central screw the blades cannot be extracted from the relative pins because corresponding parts of the lower shell rest on the lower end of said fixed pins. Consequently to replace even only one blade, the two shells have to be separated by removing the central screw.

A further known head of the type comprising pivoted blades is that described in Italian utility model No. 246620 by the same proprietor as the present patent application. This head again comprises an upper shell and a lower shell, joined together by screws in angularly equidistant positions, which do not however have to be removed to replace the blades. In this head, when the head has been assembled the pivoting pin for each blade can be moved in the two directions along its axis—which is parallel to the axis of rotation of the head—between a first and a second position. When in its first position, the pin can engage the pivoting eyelet of the relative blade without disengagement being possible, whereas with the pin in its second position the blade can be removed. Each pin is maintained in its first position by a helical spring. A pin has merely to be pressed against the action of said spring, for example by a screwdriver, to move the pin from its first position to its second position in order to be able to remove the blade. The new blade can then be mounted in position by suitably positioning its eyelet and then releasing the pin.

To replace all the blades of this head, the aforedescribed operation for replacing one of them has to be repeated a number of times equal to the number of blades, hence requiring a certain time. Anyhow, in order to achieve this, a tool (for example said screwdriver) is required.

Moreover, in this head the movable pins lose their slidability with time, until they seize because of non-uniform wear of their seat walls.

Before stating the objects of the present invention and explaining the means used to attain them, it should be noted that cutter means different from the aforesaid plastic blades are known, all provided with a pivoting eyelet, and in particular those cutter means described in Italian utility model application No. MI2005U000288 by the same proprietor as the present patent application, from the pivoting eyelet of which there extend one or more flexible elongated elements, in particular two parallel filiform elements. As described in MI2005U000288, each elongated element preferably has a flattened cross-section (for example elliptical) with its major dimension in the cutting plane and its cross-sectional area greatest close to the pivoting eyelet.

Hereinafter the expression "cutter means" therefore signifies either the said blades or the just described cutter means comprising one or more flexible elongated elements.

The technical problem to be solved by the present invention consists of providing a rotary head for a garden trimmer, of the type comprising cutter means pivoted to it, which does not present the aforestated drawbacks of the aforedescribed heads of this type. In particular, the head is required to have a smaller radial dimension than the head described and illustrated in utility model 246620, so that cutter means of greater cutting length can be used in a garden trimmer of predetermined cutting diameter; the head must also enable the cutter means to be mounted and replaced more rapidly.

The aforesaid objects are attained by the garden trimmer head of the present invention, comprising a lower shell and an upper annular shell, the lower shell being fixable coaxially to the trimmer drive shaft and presenting several fixed pins, parallel to the rotational axis of the head, for pivoting the cutter means provided with an eyelet, the upper shell being coaxially applicable in its working position to the lower shell, in which position the cutter means are retained on the relative fixed pins, characterised in that the fixed pins project upwards from the lower shell, and that to apply the upper shell to the lower shell in said working position bayonet connection means are provided requiring a coaxial movement to cause the two shells to approach each other and a rotation of the upper shell about the lower shell, this rotation being opposite to the direction of rotation of the head when working.

Besides allowing considerably quicker replacement of the cutter means, the aforedescribed solution enables a head to be provided which is of lesser diameter and weight than those of utility model 246620. Conveniently, elastic means are provided to oppose the withdrawal of the upper shell from its working position.

Again conveniently, with the bayonet connection means, means are associated which enable the upper shell to also assume a second position, in which the cutter means can be replaced, elastic means also being conveniently provided to oppose withdrawal of the upper shell from said cutter means replacement position.

The invention will be more apparent from the ensuing description of one embodiment thereof given by way of example. In this description reference is made to the accompanying drawings, in which.

Figure 1:
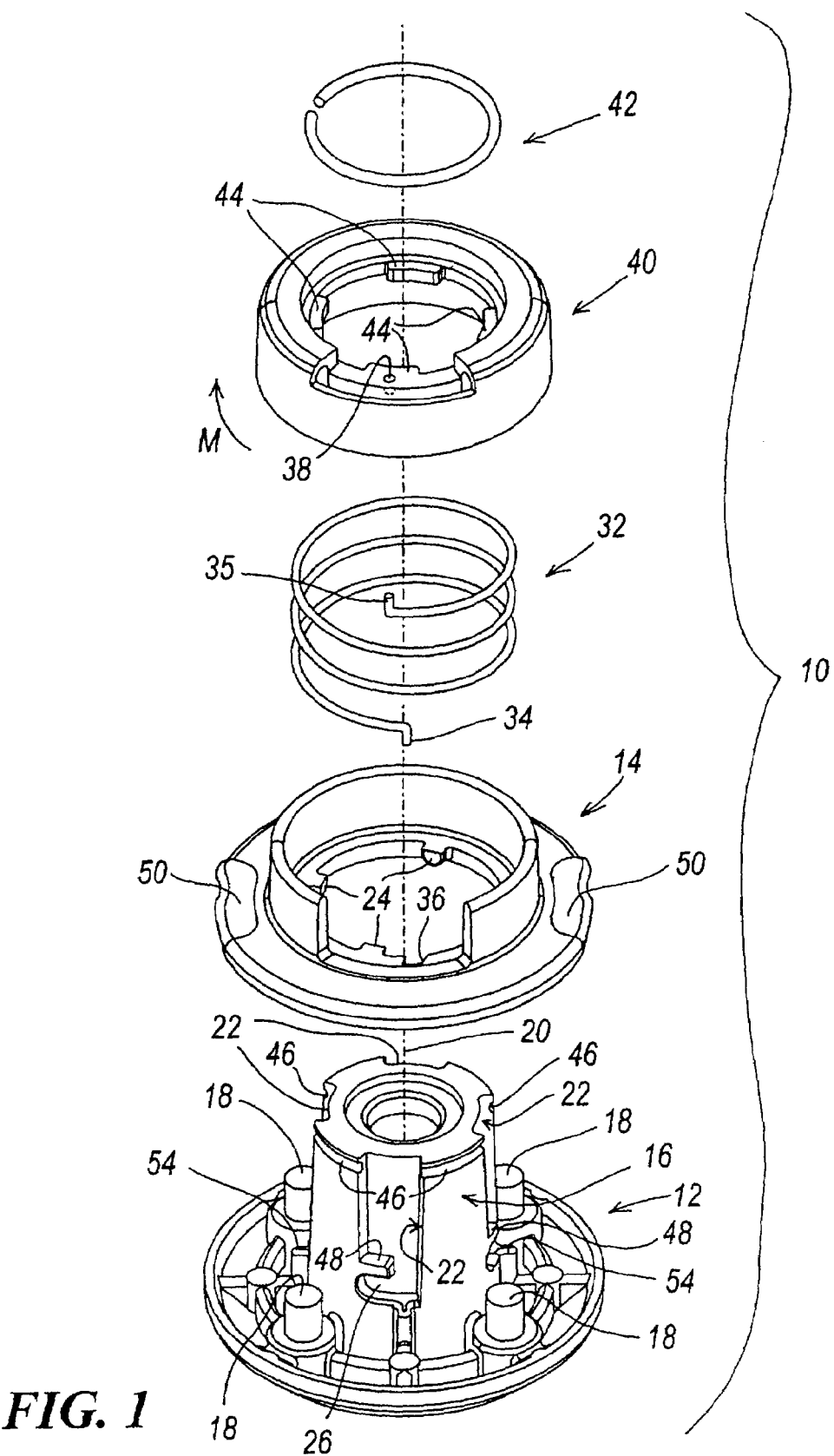
FIG. 1 is an exploded perspective view of a head according to the present invention.

As can be seen from the figures, the rotary head 10 for a garden trimmer is of overall disc shape, of the type able to accommodate pivoted cutter means, and comprises a lower shell 12 and an annular upper shell 14. The lower shell 12 is fixable in known manner to the trimmer drive shaft (not shown), the axis of this shaft being indicated by 20 and coinciding with the rotational axis of the head 10. The lower shell 12 presents an upwardly extending hub 16, and four upwardly extending fixed pins 18 disposed angularly equidistant, with the same radial distance from the axis 20 and parallel to this latter.

Four angularly equidistant vertical grooves, indicated by 22 and having the typical L shape of the grooves used in the bayonet connection means, are provided in the lateral surface of the hub 16.

The upper shell 14 internally presents four angularly equidistant teeth 24 (only three are visible in FIG. 1) radially facing the axis 20 and forming part of said bayonet connection means, each tooth 24 being arranged to cooperate with one of the grooves 22, these latter typically presenting a vertical part and a horizontal part 26 forming the L, the closed lower end of which receives the relative radial tooth 24 when the upper shell 14 is in its working position. When in this position the top of the fixed pins 18 rests against corresponding flat surfaces 52 provided on the lower face of the upper shell 14 (as shown in FIG. 2), so that the cutter means (for example those indicated by 28 and 30 in FIG. 4), when mounted on the relative fixed pin 18, cannot disengage from this latter. In this specific example the lower shell 12 also comprises teeth 54 on which the upper shell 14 rests.

An elastic means 32, consisting of a helical spring operating by both compression and torsion, maintains the radial teeth 24 at the closed end of the horizontal part 26 of the relative grooves 22, so that the upper shell 14 is unable to accidentally disengage from the lower shell 12 when the garden trimmer is not working, whereas when it is working there is no possibility of disengagement as the orientation of the horizontal part 26 of the groove 22 is chosen such that when the head 10 rotates (in the direction indicated by the arrow R in FIG. 4) the radial teeth 24 are maintained urged against the closed end of said horizontal part 26.

The helical spring 32 presents a bent lower end 34 to be inserted into a notch 36 provided in the inner edge of the upper shell 14, and a bent upper end 35 to be inserted into a corresponding hole 38 provided in an annular element 40 the purpose of which, together with a split retention ring 42 and the annular discontinuous groove 46 provided on the hub 16, is to prevent separation of the two shells 12 and 14. In this respect, on mounting the head 10 by suitably rotating the annular element 40 in the direction of the arrow M of FIG. 1, the notch 36 and the hole 38 enable the spring 32 to be torsionally loaded in order to also maintain the upper shell 14 in its working position of FIG. 2 even when the garden trimmer is not in operation.

To mount the head 10 the upper shell 14 is mounted on the hub 16 of the lower shell 12 such that the radial teeth 24 of the upper shell 14 completely enter the relative grooves 22 of the hub 16. At this point the helical spring 32 is positioned by inserting its lower end 34 into the notch 36 of the upper shell 14 and its upper end 35 into the hole 38 of the annular element 40, which is also mounted on the hub 16 such that its inner projections 44 lie in the relative grooves 22. Prior to this latter operation the annular element 40 must be rotated in the direction of the arrow M of FIG. 1 in order to torsionally load the spring 32. After thrusting the annular element 40 downwards against the spring 32 it is prevented from withdrawing from the hub 16 by inserting the split retention ring 42 into the discontinuous annular groove 46. At this point, by the action of the spring 32, the radial teeth 24 of the upper shell 14 become positioned at the closed end of the horizontal part 26 of the relative L-shaped grooves 22, the head 10 then being in its working condition (FIG. 2).

It is apparent that by using a simple screwdriver the split ring 42 and hence the annular element 40 can be removed, to enable the two shells 12 and 14 to be separated, so completely dismantling the head 10. As can be seen from FIG. 1, a ledge 48 is provided in an intermediate position along the vertical part of each of the four L-shaped grooves 22. The ledges 48 represent what has previously been called the means for enabling the upper shell to also assume a second position, in which the cutter means can be replaced. With the head 10 assembled, the relative radial tooth 24 of the upper shell 14 can be rested on each of said ledges 48 to achieve the situation of FIG. 3, in which the upper shell 14 is maintained spaced from the lower shell 12, so that the eyelet (not shown) of a cutter means pivotable to the head can be mounted on the corresponding fixed pin 18, just as the cutter means can be withdrawn from the pins 18 when they have to be replaced due to wear or damage. In this respect, the cutter means 28 and 30 of FIG. 4 can be used (those shown being of two different types).

Figure 2:
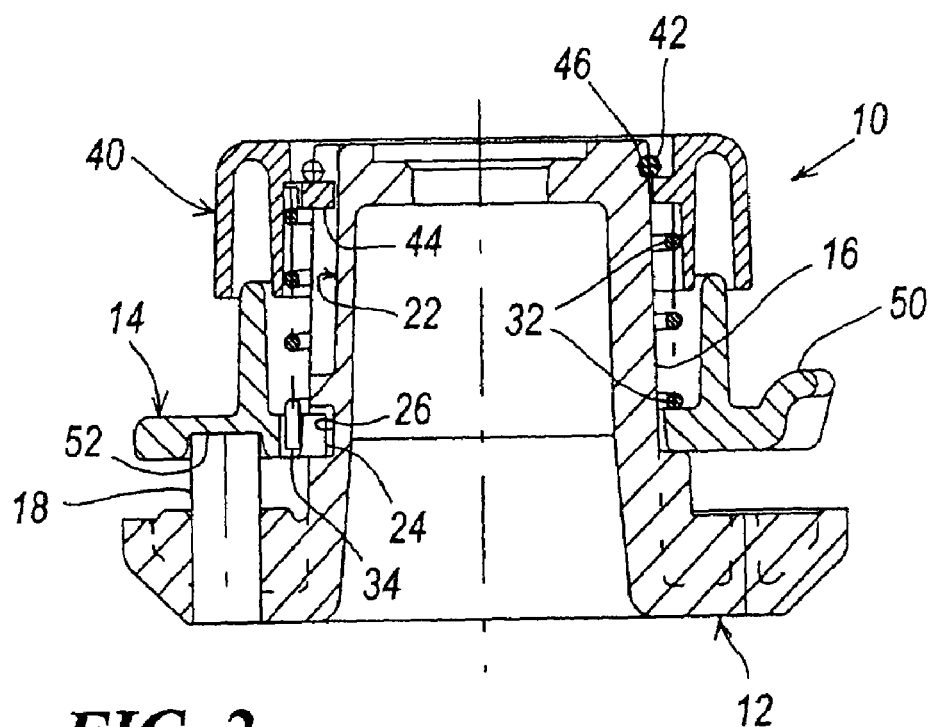
FIG. 2 is a coaxial diametrical section through the head when mounted, with the upper shell in its working position.
Figure 3:
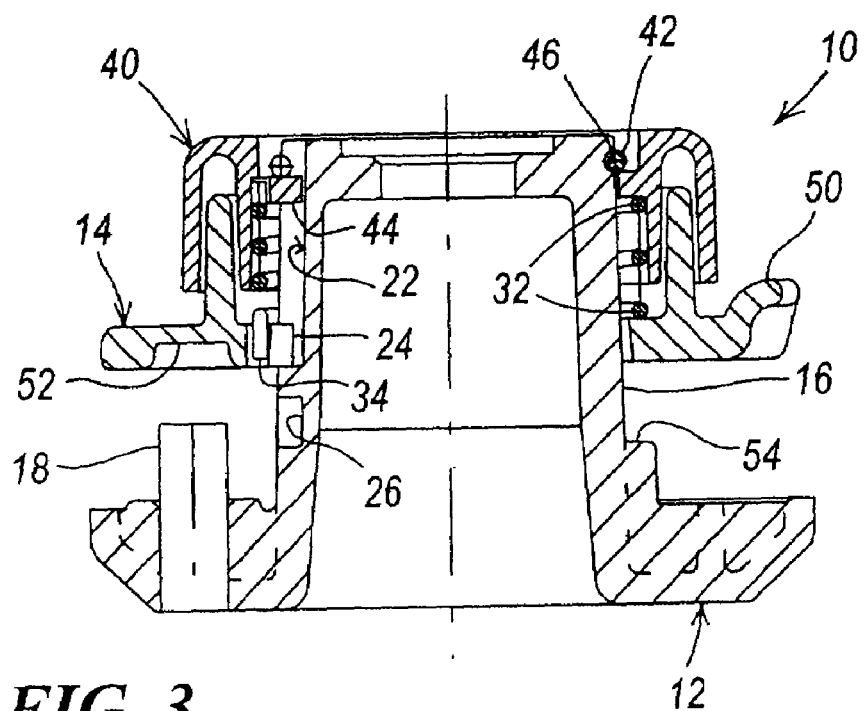
FIG. 3 is similar to FIG. 2, but with the upper shell in the cutter means replacement position.

To achieve the condition of the head 10 shown in FIG. 3 (in which the cutter means can be replaced) starting from its working condition (FIG. 2), the upper shell 14 must be held with one hand and rotated about the lower shell 12 in the opposite direction to the arrow M of FIG. 1, to overcome the torque exerted by the spring 32 (which is torsionally preloaded as stated). The upper shell 14 must then be pulled upwards against the coaxial force again exerted by the spring 32, so that the radial teeth 24 of the upper shell 14 pass beyond the level of the ledge 48. If the upper shell 14 is released at this point, the torque and the axial return force exerted on the upper shell 14 by the spring 32 cause the teeth 24 to automatically lie on the corresponding ledges 48, to achieve the condition shown in FIG. 3 in which the cutter means can be replaced.

Figure 4:
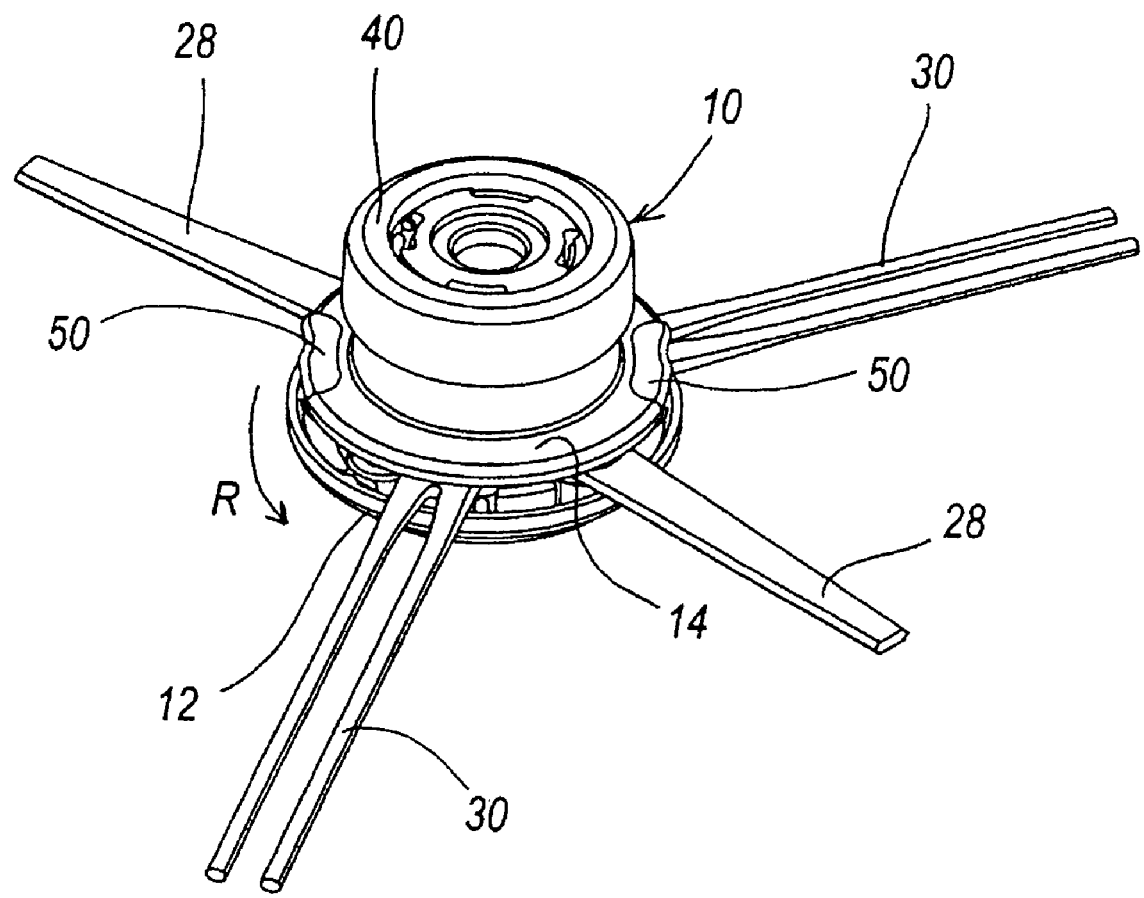
FIG. 4 is a perspective view of the head to which two different types of cutter means have been applied.

To return the head 10 to its working condition of FIG. 2, the upper shell 14 is rotated with one hand as far as possible in the direction of the arrow R of FIG. 4, and is then released. By the action of the spring 32 the upper shell 14 automatically snaps downwards but at the same time rotates in the opposite direction to the arrow R, so that its teeth 24 automatically become positioned at the closed end of the corresponding horizontal part 26 of the groove 22, to achieve the condition of FIG. 2.

As already stated, the cutter means with which the head 10 of FIG. 4 is provided are of two different types, although both are provided with an eyelet (not shown for simplicity) for pivoting to the respective fixed pins 18. Specifically, this figure shows two bladed cutter means 28 disposed opposing each other, and two double flexible linear element cutter means, also disposed opposing each other, of the type already described. In this respect it has been found convenient for certain uses to utilize cutter means of different type on the same head. Because of the rapidity and ease with which the cutter means can be replaced in the head 10 without using tools, it is tempting to replace them as required, by cutter means suitable for the specific use (for example cutter means suitable for cutting normal grass, or specifically for tough weeds, or of the type for grass in the vicinity of obstacles). It is however apparent that the cutter means mounted on the head 10 can be all of the same type, for example all of blade type or all of said type comprising one or more flexible linear elements.

From the figures it can also be seen that the upper shell 14 presents means 50 for facilitating its gripping with the hand to effect those operations which enable the cutter means 28, 30 to be replaced, the means 50 consisting essentially of two opposing projections on the edge of the upper shell 14.

The lower shell 12, the upper shell 14 and the annular element 40 can be of aluminium or its alloys (especially if for professional garden trimmers), or of a suitable plastic material, for example that already used for producing known heads.

Finally it should be noted that with the head of the present invention, no tool is required for replacing the cutter means, the hands being sufficient, and that replacement is very rapid and simple. Moreover it will be apparent to an expert of the art, on observing the accompanying figures, that the head shown therein has a decidedly small diametrical dimension.

The invention claimed is:

1. A rotary head for garden trimmers, of the type with a cutter means pivoted to the head comprising a lower shell and an upper annular shell, the lower shell being fixable coaxially to a trimmer drive shaft and presenting several fixed pins parallel to a rotational axis of the head, for pivoting the cutter means provided with an eyelet, the upper annular shell being coaxially applicable in its working position to the lower shell, in which position the cutter means are retained on the relative fixed pins, wherein the fixed pins project upwards from the lower shell, and that to apply the upper annular shell to the lower shell in said working position bayonet connection means are provided requiring a coaxial movement to cause the two shells to approach each other and a rotation of the upper annular shell about the lower shell, this rotation being opposite to a direction of rotation (R) of the head when working.

2. A head as claimed in claim 1, wherein elastic means are provided which oppose a withdrawal of the upper annular shell from its working position.

3. A head as claimed in claim 2, wherein the elastic means which oppose the withdrawal of the upper annular shell from its working position and the elastic means which oppose the withdrawal of the upper annular shell from a position for replacing the cutter means consist of a same torsionally and compressibly loadable helical spring mounted on a hub and directly or indirectly acting between the upper annular shell and the lower shell.

4. A head as claimed in claim 3, wherein one end of the helical spring is engagable with an annular element and the other end of the helical spring is engagable with the upper annular shell to enable the helical spring to be torsionally loaded, means being provided to prevent rotation of the annular element when this latter has been mounted on the hub.

5. A head as claimed in claim 4, wherein the means for preventing rotation of the annular element about the hub of the lower shell comprise projections provided in an interior of the annular element to engage in a vertical part of a relative L-shaped groove.

6. A head as claimed in claim 2, wherein the head has a body comprised of aluminium or its alloys.

7. A head as claimed in claim 2, wherein the head has a body comprised of plastic material.

8. A head as claimed in claim 2, wherein the fixed pins of the lower shell are four in number.

9. A head as claimed in claim 2, wherein the upper annular shell peripherally presents means to facilitate its gripping by a hand in order to effect those operations which enable the cutter means to be replaced.

10. A head as claimed in claim 9, wherein means that enable the upper annular shell to also assume a second position, in which the cutter means can be replaced, are associated with the bayonet connection means.

11. A head as claimed in claim 2, wherein means which enable the upper annular shell to also assume a second position, in which the cutter means can be replaced, are associated with the bayonet connection means.

12. A head as claimed in claim 11, wherein the means which enable the upper annular shell to also assume a second position in which the cutter means can be replaced comprise ledges on which radial teeth of the upper annular shell can rest, each of said ledges being provided in an intermediate position along a vertical part of a relative L-shaped groove.

13. A head as claimed in claim 2, wherein the bayonet connection means comprise several angularly equidistant L-shaped grooves provided in a lateral surface of an upwardly projecting hub with which the lower shell is provided, and corresponding radial teeth provided in an interior of the upper annular shell to cooperate with the L-shaped grooves of the lower shell.

14. A head as claimed in claim 13, wherein the L-shaped grooves of the lower shell and the corresponding radial teeth of the upper annular shell are four in number.

15. A head as claimed in claim 13, wherein an annular element can be mounted on a predetermined portion of an upper end of the hub, means being provided to prevent accidental withdrawal of the annular element.

16. A head as claimed in claim 15, wherein the means for preventing accidental withdrawal of the annular element from the hub comprise a split retention ring and a discontinuous annular groove provided in proximity to the upper end of the hub to only partially receive the split retention ring, the projection of this latter from the discontinuous annular groove preventing withdrawal of the annular element.

17. A head as claimed in claim 1, wherein means which enable the upper shell to also assume a second position, in which the cutter means can be replaced, are associated with the bayonet connection means.

18. A head as claimed in claim 17, wherein the means which enable the upper shell to also assume a position in which the cutter means can be replaced comprise ledges on which the radial teeth of the upper shell can rest, each of said ledges being provided in an intermediate position along the vertical part of a relative L-shaped groove.

19. A head as claimed in claim 1, wherein means which enable the upper shell to also assume a second position, in which the cutter means can be replaced, are associated with the bayonet connection means.

20. A head as claimed in claim 1, wherein the bayonet connection means comprise several angularly equidistant L-shaped grooves provided in the lateral surface of an upwardly projecting hub with which the lower shell is provided, and corresponding radial teeth provided in the interior of the annular upper shell to cooperate with the L-shaped grooves of the lower shell.

21. A head as claimed in claim 20, wherein the L-shaped grooves and ledges of the lower shell and the corresponding radial teeth of the upper shell are four in number.

22. A head as claimed in claim 20, wherein an annular element can be mounted on a predetermined portion of the upper end of the hub, means being provided to prevent accidental withdrawal of the element.

23. A head as claimed in claim 22, wherein the means for preventing accidental withdrawal of the annular element from the hub comprise a split retention ring and a discontinuous annular groove provided in proximity to the upper end of the hub to only partially receive the split retention ring, the projection of this latter from the groove preventing withdrawal of the annular element.

24. A head as claimed in claim 1, wherein the fixed pins of the lower shell are four in number.

25. A head as claimed in claim 1, wherein the upper shell peripherally presents means to facilitate its gripping by the hand in order to effect those operations which enable the cutter means to be replaced.

26. A head as claimed in claim 1, wherein its body is of aluminium or its alloys.

27. A head as claimed in claim 1, wherein its body is of plastic material.

* * * * *